(12) United States Patent
Pohl

(10) Patent No.: US 6,400,547 B1
(45) Date of Patent: Jun. 4, 2002

(54) METHOD OF MONITORING STATE PARAMETERS IN A SWITCHING DEVICE, AND ASSOCIATED DEVICE

(75) Inventor: Fritz Pohl, Hemhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/541,723

(22) Filed: Apr. 3, 2000

Related U.S. Application Data

(63) Continuation of application No. PCT/DE98/02871, filed on Sep. 28, 1998.

(30) Foreign Application Priority Data

Oct. 1, 1997 (DE) ......................................... 197 43 499

(51) Int. Cl.⁷ .............................................. H01H 73/00
(52) U.S. Cl. ........................ 361/115; 361/111; 361/118
(58) Field of Search ................................. 361/118, 111, 361/115, 119, 71, 70

(56) References Cited

U.S. PATENT DOCUMENTS 5,825,179 A * 10/1998 Sherman et al. ............. 324/210
5,844,493 A * 12/1998 Pohl .......................... 340/657

FOREIGN PATENT DOCUMENTS

| DE | 28 13 451 A1 | 10/1979 | ............ H02J/13/00 |
| DE | 36 09 430 A1 | 9/1987 | ............ G08C/15/06 |
| DE | 197 07 729 A1 | 8/1997 | ............ H01H/9/16 |

OTHER PUBLICATIONS

International Publication WO 96/07192 (Pohl et al.), Mar. 7, 1996.

* cited by examiner

Primary Examiner—Stephen W. Jackson
(74) Attorney, Agent, or Firm—Laurence A. Greenberg; Werner H. Stemer; Ralph E. Locher

(57) ABSTRACT

A method of monitoring state parameters in a switching device records and evaluates sensor signals of sensors which are susceptible to an interference caused by external electrical or magnetic fields. A temporal sequence of the sensor signals is evaluated by determining whether the sensor signals are disturbed or undisturbed. The interference in the sensor signals is suppressed by generating evaluation signals which correspond to the undisturbed signals. A device for monitoring state parameters of a switching device includes sensors for recording sensor signals and includes a passive interference suppression device and an active interference suppression device for suppressing the interference.

21 Claims, 5 Drawing Sheets

Detected Switching State:

- On
- Welded
- Off
- Short-Circuit

Short-Circuit Indication

METHOD OF MONITORING STATE
PARAMETERS IN A SWITCHING DEVICE,
AND ASSOCIATED DEVICE

CROSS REFERENCE TO RELATED APPLICATION

This application is a continuation of copending International Application No. PCT/DE98/02871, filed Sep. 28, 1998, which designated the United States.

BACKGROUND OF THE INVENTION

1. Field of the Invention

The invention relates to a method of monitoring the state parameters in a switching device, preferably monitoring a switch position, tripping causes and/or device faults, by recording and evaluating suitable signals, wherein sensors are used which can be influenced or disturbed by external electrical and/or magnetic fields. The invention also relates to an associated device for carrying out this method, wherein a switching device has associated devices for monitoring state parameters, such as a switch position, tripping causes and/or device faults. Sensors which are used for monitoring the state parameters can be influenced or disturbed by external electrical and/or magnetic fields.

International Publication WO 96 07 192 A2 discloses a switching device having devices for a state recognition or state detection. In such switching devices, for example circuit breakers, a suitable sensor equipment is able to record a wide variety of state parameters, such as the switch position "on" or "off". In addition, it is also possible to record specific switching device tripping causes, such as "short circuit" or "overcurrent" and also general device faults, such as "switching contacts welded." An advantage here is that the sensors, inside their own sensor housing, can be placed at a suitable location, wherein the sensor housing can be coupled to a side of the switching device housing, for example, and that neither a mechanical or optical operative connection nor an electrical line connection from the switching device housing and/or the line conductors connected thereto must be led into the interior of the sensor housing. In this case, it is desired, in the context of switchgear devices which are able to communicate, to allow a processing and central reporting of the monitored and recorded switching states via a bus system, for example.

The devices used in practice to date for a switchgear monitoring, for example auxiliary switches and fault signal switches in line circuit breakers or short-circuit indicator switches in circuit breakers, operate entirely electromechanically and are consequently not susceptible to electromagnetic interference influences. At the most, problems arise here only from converting the electrical contact signals into bus-compatible and electronics-compatible control signals. However, if specific electrical sensors are used, then, based on the sensors used, there is a different fault or interference characteristic, depending on the sensor principle. These electrical sensors must be protected against a respective specific interference.

SUMMARY OF THE INVENTION

It is accordingly an object of the invention to provide a method of monitoring state parameters and an associated device for performing the method which overcome the above-mentioned disadvantages of the heretofore-known methods and devices of this general type and which ensure a reliable indication of the switching state.

With the foregoing and other objects in view there is provided, in accordance with the invention, a method of monitoring a switching device, which includes the steps of:

monitoring state parameters in a switching device by recording and evaluating sensor signals of sensors susceptible to an interference caused by at least one of an external electrical field and an external magnetic field;

determining whether the sensor signals are disturbed signals or undisturbed signals by evaluating a temporal sequence of the sensor signals; and suppressing the interference in the sensor signals by generating evaluation signals corresponding to the undisturbed signals.

In accordance with another mode of the invention, the step of monitoring the state parameters in the switching device includes monitoring a switch position, a tripping cause and/or a device fault.

In accordance with yet another mode of the invention, the evaluation signals are decoupled from an interference produced by the switching device and/or from the interference caused by the external electrical or magnetic field.

In accordance with a further mode of the invention, the evaluation signals are electronically processed.

In accordance with yet a further mode of the invention, the evaluation signals are checked for plausibility. The evaluation signals are discriminated from signal patterns caused by the interference.

In accordance with another mode of the invention, the sensors record steady-state signals and transient signals of switching states of the switching device. A state signal is derived from each of the steady-state signals by electronically processing the steady-state signals. The state signal follows a state change after a given time interval if a new state remains unchanged within the given time interval. An interference-suppressed steady-state signal is then formed. A further state signal is derived from each of the transient state signals, actuated by slow actuators, such as a bimetallic strip, by electronically processing the transient state signals. The further state signal follows a state change after a given time interval if a new state remains unchanged within the given time interval. An interference-suppressed transient state signal is then formed. The transient state signals of fast actuators are logically combined with the interference-suppressed steady-state signals and with the steady-state signals not subjected to interference suppression. As a result of the combining step, at least one of the steps of enabling a signal path of a transient state signal, disabling the signal path of the transient state signal, permanently storing the transient state signal after being temporarily stored, and erasing the transient state signal after being temporarily stored is selectively performed.

In accordance with an added mode of the invention, transient state signals, such as a short-circuit tripping, are assessed selectively as a state signal being unaffected or as being affected by the interference by using a defined temporal signal pattern of sensor signals. If the state signal affected by the interference has been recognized, at least one of the steps of disabling the signal path and erasing the transient state signal after being temporarily stored is performed for deriving interference-suppressed transient state signals from the transient state signals.

In accordance with another mode of the invention, the interference-suppressed transient state signals, such as an overcurrent tripping signal and/or a short-circuit tripping signal, are stored and only a superordinate interference-suppressed transient signal, such as the short-circuit tripping signal, is indicated.

According to a preferred embodiment of the method according to the invention, the steady-state and non-steady-state, i.e. transient, signals are advantageously processed such that undisturbed signals are generated from the disturbed signals for a further evaluation. In the corresponding device according to the invention, there are devices or measures for passive interference suppression, on the one hand, and active interference suppression, on the other hand, for this purpose.

The devices or measures for the passive interference suppression are preferably suitable shielding measures, while the devices for active interference suppression preferably operate electronically. Advantageously, the combination of passive interference suppression with active interference suppression can then end interference events with a sufficient intensity within a predetermined time interval.

In the context of the invention, it is possible for the state parameter changes recorded by the sensor equipment to be temporarily stored and, if a fault is recognized within a predeterminable time interval, for the old values of the state parameters to be retained. This ensures that, in a further communication, no incorrect statements about state parameters are processed.

A particularly advantage of the invention is that the possibility of combining passive and active interference suppression allows a selective assessment of the characteristic processes. This advantage applies both, for the simple and reliable interference suppression in stationary sensor signals and for the complex form of the interference suppression in the transient sensor signals. Thus, considerable progress is made in comparison with the previously used concepts working with reflection light barriers. Interference suppression in sensor circuits for applications in the switching technology will become particularly significant in the future.

With the objects of the invention in view there is also provided, in combination with a switching device having state parameters, a device for monitoring the state parameters, including:

sensors for recording sensor signals significant for a switching state, the sensors being susceptible to an interference caused by at least one of an external electrical field and an external magnetic field;

an evaluator connected to the sensors for evaluating a signal sequence of the sensor signals and for determining if the sensor signals are affected by the interference;

a passive interference suppression device associated with the sensors for a passive interference suppression; and an active interference suppression device, such as an electronic circuit, connected to the evaluator generating evaluation signals corresponding to the sensor signals in a state unaffected by the interference for an active interference suppression.

In accordance with another feature of the invention, the sensors record the sensor signals significant for the switching state corresponding to a switch position, a tripping cause, and/or a device fault.

In accordance with yet another feature of the invention, the passive interference suppression device is a shield for shielding the sensors against the external electrical field and/or the external magnetic field. The shield preferably includes shielding plates made of a ferromagnetic material and/or a nonferromagnetic material with a high electrical conductivity.

In accordance with a further feature of the invention, the electronic circuit recognizes an occurrence of a disturbance of the sensors by recognizing a predefined faulty signal pattern of the sensor signals.

In accordance with another feature of the invention, the electronic circuit evaluates a signal pattern by evaluating current sensor signals and/or temporal courses of the sensor signals.

In accordance with an added feature of the invention, the passive interference suppression device together with the active interference suppression device terminate interference events with a sufficient strength within a given time interval.

In accordance with yet another feature of the invention, the evaluator temporarily stores changes of the state parameters and retains old values of the state parameters, if a fault is recognized within a given time interval.

Other features which are considered as characteristic for the invention are set forth in the appended claims.

Although the invention is illustrated and described herein as embodied in a method of monitoring state parameters in a switching device, and an associated device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
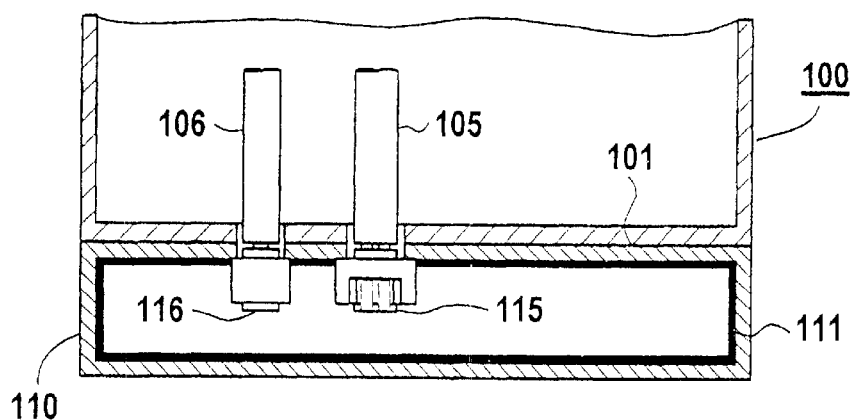
FIG. 1 is a partial, cross-sectional view of a device for monitoring state parameters, having a switching device with sensors and suitable shielding measures.

In the figures the same parts or parts which have the same function or action are indicated with the same reference symbols, so that some of the figures can be described jointly. In the present case, the switchgear devices considered are, in particular, circuit breakers or power switches. As mentioned above, in the International Publication WO 96 07 192 A1, configurations, which allow the state of the switching device to be recorded, have already been proposed. Referring now to the figures of the drawings in detail and first, particularly, to FIG. 1 thereof, there is shown a partial section of a switching device 100. Fitted to one side 101 of the switching device is an enclosure or housing 110 which contains, on the fitting side, two cylindrical bushings from which connection shafts 115, 116 protrude for the purpose of coupling, on the one hand, to the switching shaft 105 and, on the other hand, to the short-circuit tripping shaft 106. The housing 110 forms a component which can be removed from the switching device housing and is coupled only via the connection shafts 115 and 116.

Figure 2:
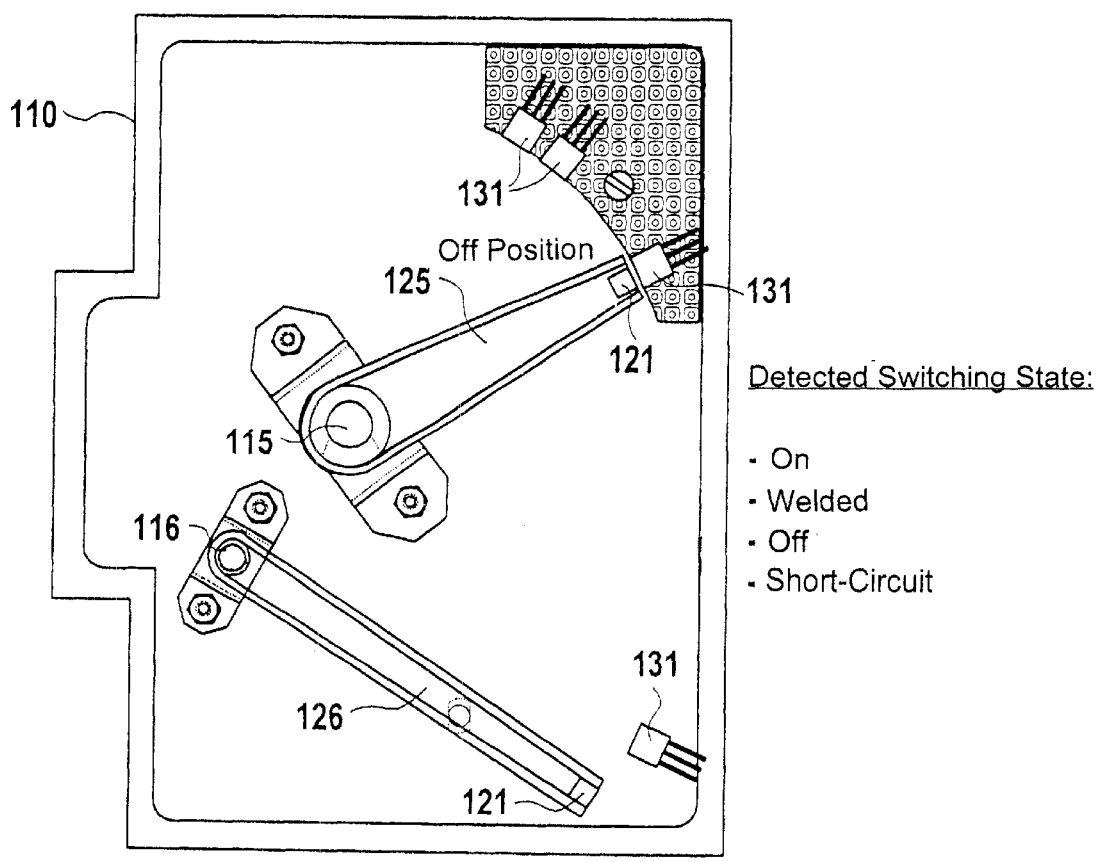
FIG. 2 is plan view of a device for monitoring state parameters, having a switching device with sensors and suitable shielding measures.

As is shown in FIG. 2, in the housing 110 there are rotating levers 125 and 126 which are firmly connected to the shafts 105 and 106 and are each fitted with permanent magnets 121 at their free end. At a suitable point in the housing, the permanent magnets 121 have associated magnetic field sensors 131 which, depending on the respective position of the rotating levers 125 and 126, produce electrical signals which are characteristic of a particular switching state in the switching device 100. This allows the "electrically on/off", "short circuit" or else "welded" functions to be detected and indicated.

FIG. 1, in particular, shows that the housing 110 has an internal shielding can 111 for holding at least the sensor equipment 121, 131. Similarly, the evaluation electronics, described in detail below with the aid of FIGS. 3 to 6, can also be provided inside the shielding can 111.

The sensors used for the latter purpose have a different interference characteristic, depending on the sensor principle, and need to be protected from specific interference effects. As an example, magnetic field sensors can be affected by interference from the magnetic field of permanent magnets or current-carrying conductors, while optoelectronic sensors respond, in particular, to electromagnetic interference fields, such as switching voltages.

A first interference suppression measure is therefore, generally, to shield the sensors used and the associated evaluation circuit, and to use shielded line connections. Although such shielding measures can be used to attenuate interference effects, it is generally not possible to suppress very intense interference. Particularly in the case of switching state recognition for a circuit breaker, it is however, necessary to protect the magnetic sensor equipment which is advantageously used for this, against magnetic fields from neighboring circuit breakers switching short circuits. In the event of a short circuit, short-circuit currents of 20 kA can produce a magnetic field of approximately 0.1 T, for example, when the distance between the current path and the sensor is from 2 to 5 cm. Since the response threshold of such sensors is usually approximately 1 mT, passive shielding measures are not sufficient. In addition, electronically active interference suppression measures are necessary for the sensor equipment.

Besides the passive interference suppression as shown in FIGS. 1 and 2, an increased interference immunity is additionally ensured by an electronically active interference suppression for the sensor equipment by using a suitable interference-suppression logic. The essential point here is that, when the sensor equipment is operating unaffected by interference, particular signal patterns caused by operation of the switching device occur whose temporal course is significantly changed by the influences of interference. It is fundamental here that, due to the passive interference immunity resulting from the suitable shields, the necessary interference level can originate only from events lasting for short periods. Thus, for example, the short-circuit current in an adjacent current path must be >2 kA to cause the sensor to respond, which results in a short-circuit duration of in any case <100 ms. This measure of time is used for the electronic active interference suppression in the interference suppression method described with reference to FIGS. 3 to 5. A common feature of each of these figures is a circuit including input flip-flops 1, 1' . . . , and input elements 2, 2' . . . and output flip-flops 3, 3' . . . , which are connected to appropriate resistors R and capacitances. The set pulses produce the desired statement at the output.

Figure 6:
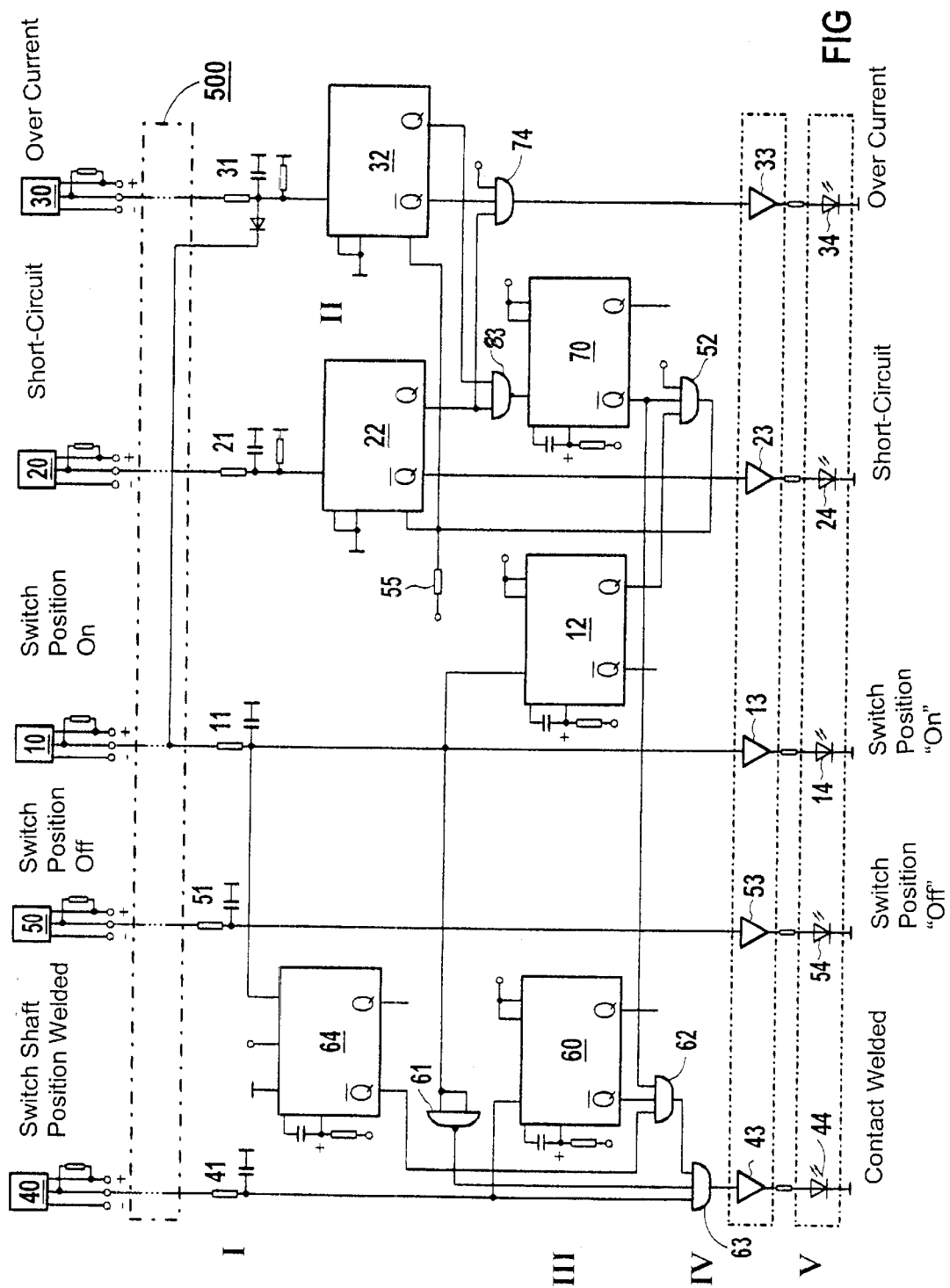
FIG. 6 is a circuit diagram of a circuit for recognizing the switching state of a known switch.

FIG. 6, specifically, shows how it is possible to evaluate the individual statements, switch position "off" or switch position "on", "short circuit" or "overcurrent", and the switching shaft in "welded position" function, in parallel. In this case, region I of the electronic circuit shows the pulse shaping with RC attenuation of voltage spikes, region II shows the electronic storage of transient state signals with the D flip-flop for short circuit and overcurrent, region III shows the timers for time-limited actuation or control and signal logic, region IV shows the AND/NAND gates for signal logic, and region V shows the visual status indication, respectively. The latter described figure is related to FIG. 3 in WO-A-9607192, to which reference will be made again further below.

The measures described above for electronic interference suppression will be described in detail using the example of a switching state recognition for a circuit breaker. For sensor recording, the following state variables are selected:

"off"
"welded"
"overcurrent tripping"
"short-circuit tripping"
Implementation involves monitoring the position
of the switching shaft for the mechanical "on", "off" and "welded" states,
of the pawl of the undervoltage release for overcurrent tripping, and
of the short-circuit tripping shaft for short-circuit tripping.

For monitoring purposes, the position of mechanically coupled, driven sensor magnets is recorded using anisotropic magnetoresistive sensors. The monitored position is represented by the sensor signal, in which case—when there are no interference effects—the sensor switches from a 0 to a 1 signal at the signal output when a sensor magnet comes sufficiently close, and indicates a 0 signal again when the sensor magnet is removed.

Figure 3:
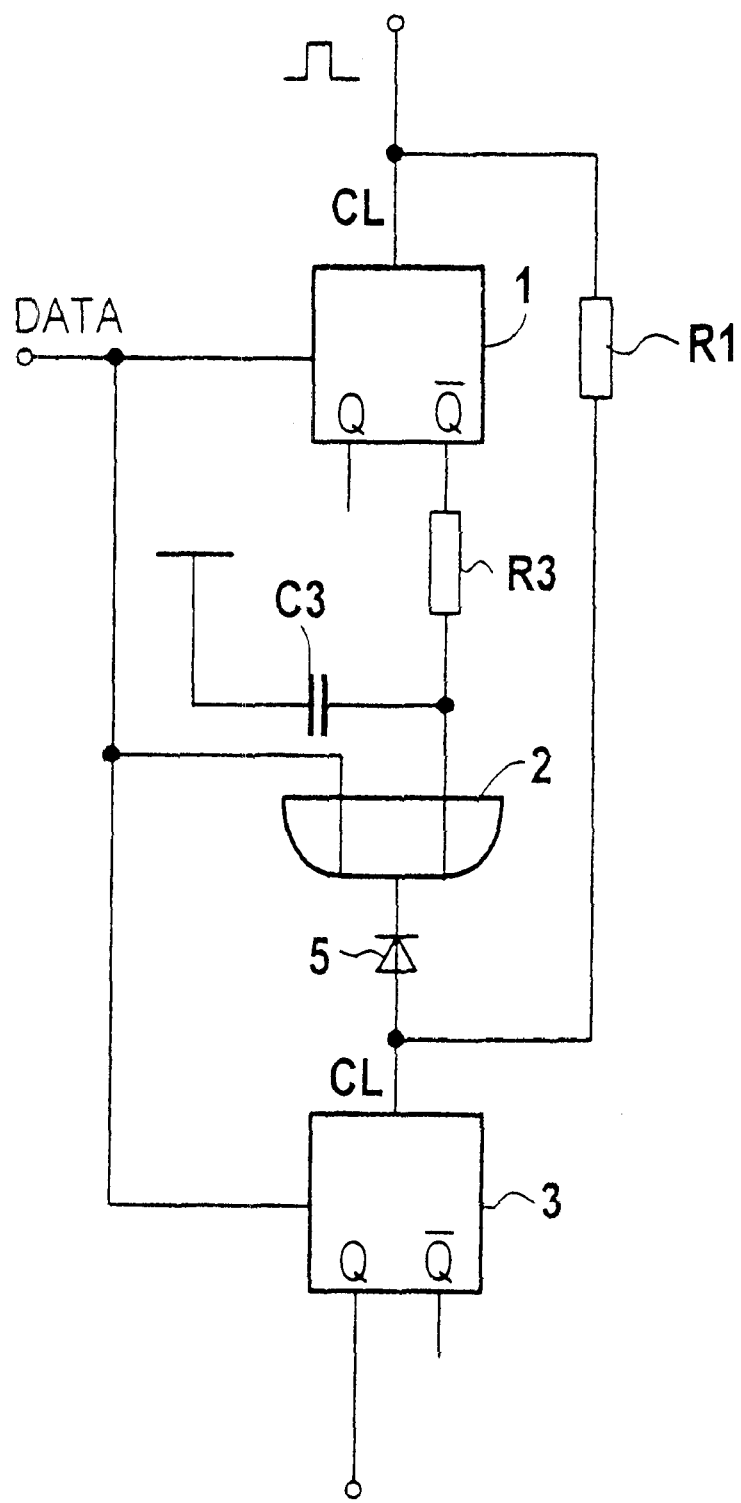
FIG. 3 is a circuit diagram of an interference suppression circuit for storing a state signal if the signal does not change between two successive set pulses, a set pulse being understood as a command to store the signal.

The switching changes, necessary for recording the switching states, in FIG. 6 as compared with FIG. 3 in WO-A-9607192 specifically relate to the circuit range 500 with electronic interference suppression and signal inversion for the sensor signals, to the additional recording of the "off" switch position and to the disabling of the overcurrent indication when in the "on" switch position.

During switching processes, these sensor signals will occur in a particular time sequence. If the indication from one or more sensors is affected by interference, and is therefore incorrect, this will be recognized by the fact that the predetermined timing of the signal sequence is not being observed.

Of the five switching states listed, the first three states are recorded as a steady-state signal, while the overcurrent tripping and the short-circuit tripping appear as transient signal states and have to be stored to record them.

Electronic, active interference suppression for the steady-state and transient sensor signals is carried out in different ways. A common feature is passive interference suppression, in which the physical sensor regions are protected from electromagnetic fields by a metal shield (Fe/Cu). The purpose of passive interference suppression is for the sensor signal to be corrupted only when there is an interference signal of sufficient intensity. When the magnetoresistive sensors used are shielded, the magnetic field from adjacent power conductors carrying short-circuit currents produces interference in the sensor signal. Such interference events only occur for a short time, however, and can be eliminated by the switching logic described below for two separate applications.

1. Interference Suppression for the Steady-state Sensor Signals "on", "off" and "welded":

The steady-state or stationary character of these signals is taken into account in that, when output on a visual indicator or a bus system, no signal change must have arisen over a time interval that has passed. In this regard, the sensor signal is sampled at a predetermined clock frequency and the output signal is equated to the sensor signal, provided the latter has not changed over a particular number of clock cycles.

As shown in FIG. 3, a simple digital interference suppression circuit contains a dual D flip-flop which is linked via an EXCLUSIVE-OR gate and is driven by a set pulse every 100 ms. This flip-flop circuit stores the signal applied to the data input only if there is no signal change between the preceding and present storage instants.

The circuit includes the "input" flip-flop 1 with an R-C delay element at the Q output, an EXCLUSIVE-OR gate and the "output" flip-flop 3. The EXCLUSIVE-OR gate is used to compare the present and penultimate stored data signals from the "input" flip-flop 1. If the two data signals are different, the clock input of the "output" flip-flop 3 is disabled and its memory content remains unchanged. If it is assumed, for switching state recognition, that interference lasts for less than 100 ms, then, as an example, a pulse length of 50 $\mu$s and a repetition rate of 10 Hz can be stipulated for the set pulses applied to the clock input, and 1 ms can be stipulated for the R-C delay time. The state signals indicated are then identical to the state signals not affected by interference. If the state signals change regularly, this is indicated 100–200 ms later.

Figure 4:
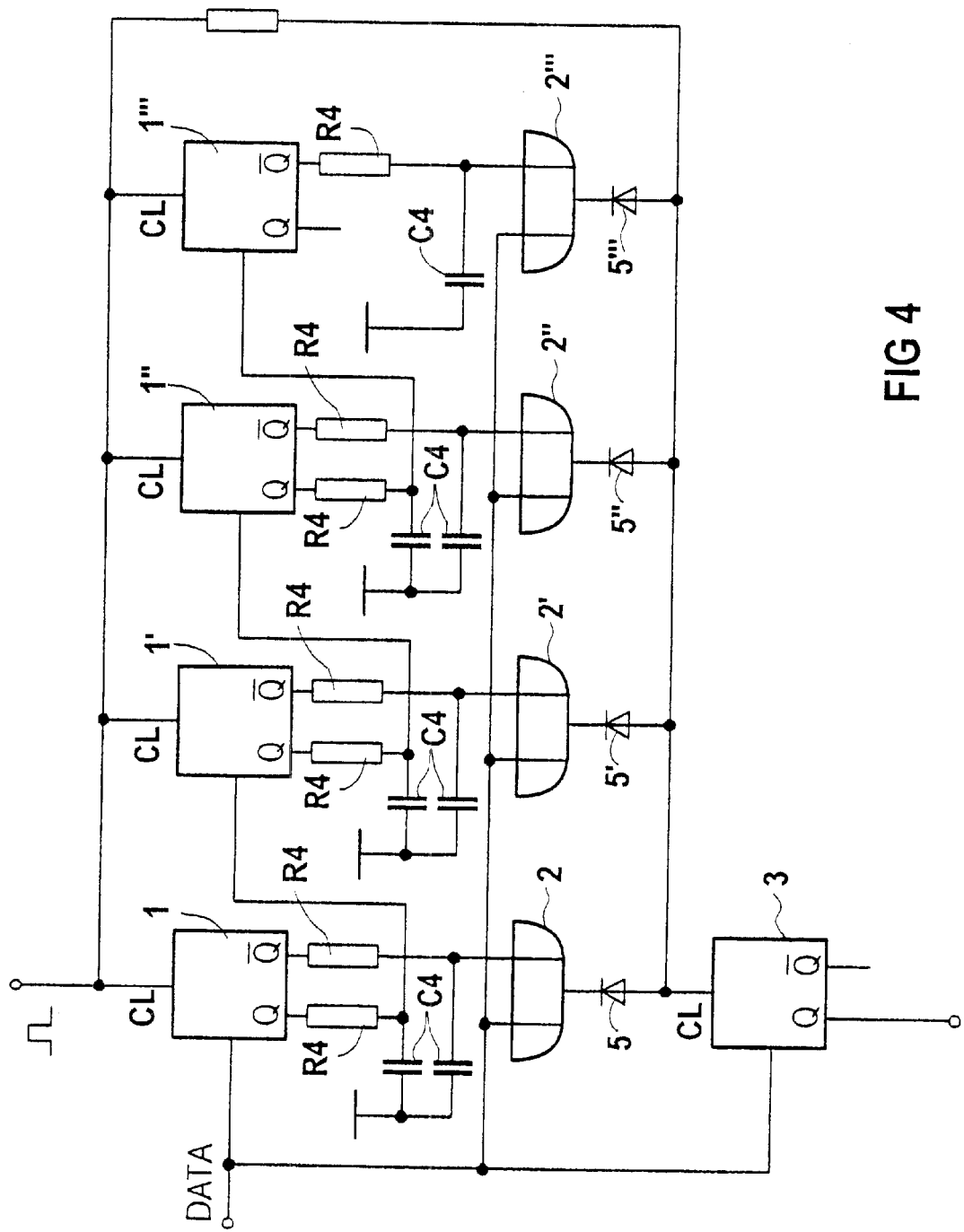
FIG. 4 is a circuit diagram of an interference suppression circuit for storing a state signal if the signal does not change within five successive set pulses.

In FIG. 4, the flip-flop circuit shown in FIG. 3 is expanded by a cascade of "input" flip-flops 1', 1", . . . With n–1 "input" flip-flops and one "output" flip-flop 3, the signal applied to the data input is stored by the "output" flip-flop 3, provided it has not changed for n successive storage instants.

A change in the data signal at the first "input" flip-flop 1 is shifted through the entire cascade of further "input" flip-flops 1', 1", . . . with the subsequent set pulses. In the case of a data signal affected by interference . . . 1-1-1-0-1-1 . . . (instead of 1-1-1-1-1-1 . . . ), the first "input" flip-flop 1 disables the clock input of the "output" flip-flop 3 via the associated EXCLUSIVE-OR gate 2 for the signal change 1-0 and 0-1. With the subsequent set pulses, the respectively next "input" flip-flop 1' now disables, via its EXCLUSIVE-OR gate 2', the clock input of the "output" flip-flop 2. The outputs of the EXCLUSIVE-OR gates 2, 2', 2", . . . are connected to the clock input via diodes 5, 5', 5", . . . so that the "low signal" is dominant. When all the "input" flip-flops have been negotiated, the clock input is enabled for the following set pulse, and the data signal is stored in the "output" flip-flop 3.

An equivalent, processor-controlled interference suppression logic includes n input memory cells, which contain the present and (n–1) past signal states, and an output memory cell. With each measurement clock pulse, the memory contents of the first to (n–1)th memory cells are advanced to memory cells 2 to n, and the present data signal is stored in the preceding memory.

If the memory contents of all n memory cells match, then the present data signal is also stored in the output memory.

The measurement clock signal and the number of input memories are chosen such that an assumed maximum interference duration of, for example, 100 ms is covered. The output memory therefore indicates the switching state signal not affected by interference.

2. Interference Suppression for the Transient "Overcurrent tripping" and "short-circuit tripping" Sensor Signals 2.1. Overcurrent Tripping:

If the overcurrent sensor directly or indirectly monitors the slow-acting deflection of the bimetallic strip, then an interference-immune indication is produced as a result of the sensor signal being subjected to interference suppression by a circuit as shown in FIG. 3 or 4. This is the case for the switching state recognition implemented for the circuit breaker. The sensor signal which has been subjected to interference suppression is permanently stored by an associated flip-flop in an evaluation circuit as shown in FIG. 6 and is indicated, provided that no short-circuit event was recorded at the same time.

An overcurrent can sometimes also be recorded by much faster reacting components of the switching mechanism than a bimetallic strip. One example is the latching movement of a miniature circuit breaker, which occurs within a time interval of less than 10 ms. Simple interference suppression, as, in the case of steady-state signals, by evaluating the signal response over time, is no longer possible in this case. Instead, possible overcurrent tripping, which is erased again if unconfirmed, is temporarily stored.

To this end, the overcurrent sensor signal is ANDed with the "on" signal which has been subjected to interference suppression as shown in FIG. 3 or 4, in order to prevent the overcurrent indicator from responding incorrectly when the switching device is in the disconnected state. When the overcurrent sensor has responded, the evaluation circuit shown in FIG. 6 sets the associated flip-flop when the "on" signal which has not been subjected to interference suppression undergoes a signal change (yes→no). This results in a temporary storage of possible overcurrent tripping with simultaneous interruption of signal output over a time interval. This is configured (for example at 300 ms) such that, in the event of actual overcurrent tripping, there is a reliable signal change (yes→no) in the "on" signal which has been subjected to interference suppression. If no such signal change occurs, the "overcurrent" flip-flop is reset at the end of this time interval and the overcurrent recording device is put on standby.

2.2. Short-circuit Tripping

Short-circuit tripping can occur in the connected state (sircuit O) or during the connection process (circuit C-O). For this, the short-circuit sensor is briefly actuated, that is to say, in the case of the circuit breaker, by recording the position of the short-circuit tripping shaft, and in the case of a miniature circuit breaker or line circuit breaker, for example, by recording the magnetic field at the magnetic release. Interference suppression through the use of repeated interrogation of the sensor signal within a predetermined time interval as shown in FIG. 3 or 4 is therefore not possible in this case.

If the short-circuit switching is O (equivalent to open), the sensor signal is temporarily stored in an associated flip-flop, but the signal output is disabled for a predetermined time interval. By interrogating, at the end of this time interval, the "on" signal which has been subjected to interference suppression, a check is carried out to determine whether the switching device is still in the connected state.

If this is confirmed, the "short circuit" flip-flop is reset and the short-circuit recording device is put on standby.

If the short-circuit switching is C-O (equivalent to close open), the switching shaft is moved from the off position to the intermediate position "welded" in the circuit breaker, in which intermediate position the switching contacts close the main current paths and initiate the short circuit. This process, which is carried out by manual action, for example, requires a time period of 30–40 ms. This property can be used for interference suppression in that, when there is an "off" sensor signal change "yes→no", a signal changing with a 20 ms delay is derived for the purposes of further signal logic. If a short-circuit signal from the sensor occurs in the 20 ms time interval, then the short-circuit sensor is subject to interference. In this case, the signal path to the "short-circuit" flip-flop is blocked for a predetermined time interval (for example 200 ms).

Figure 5:
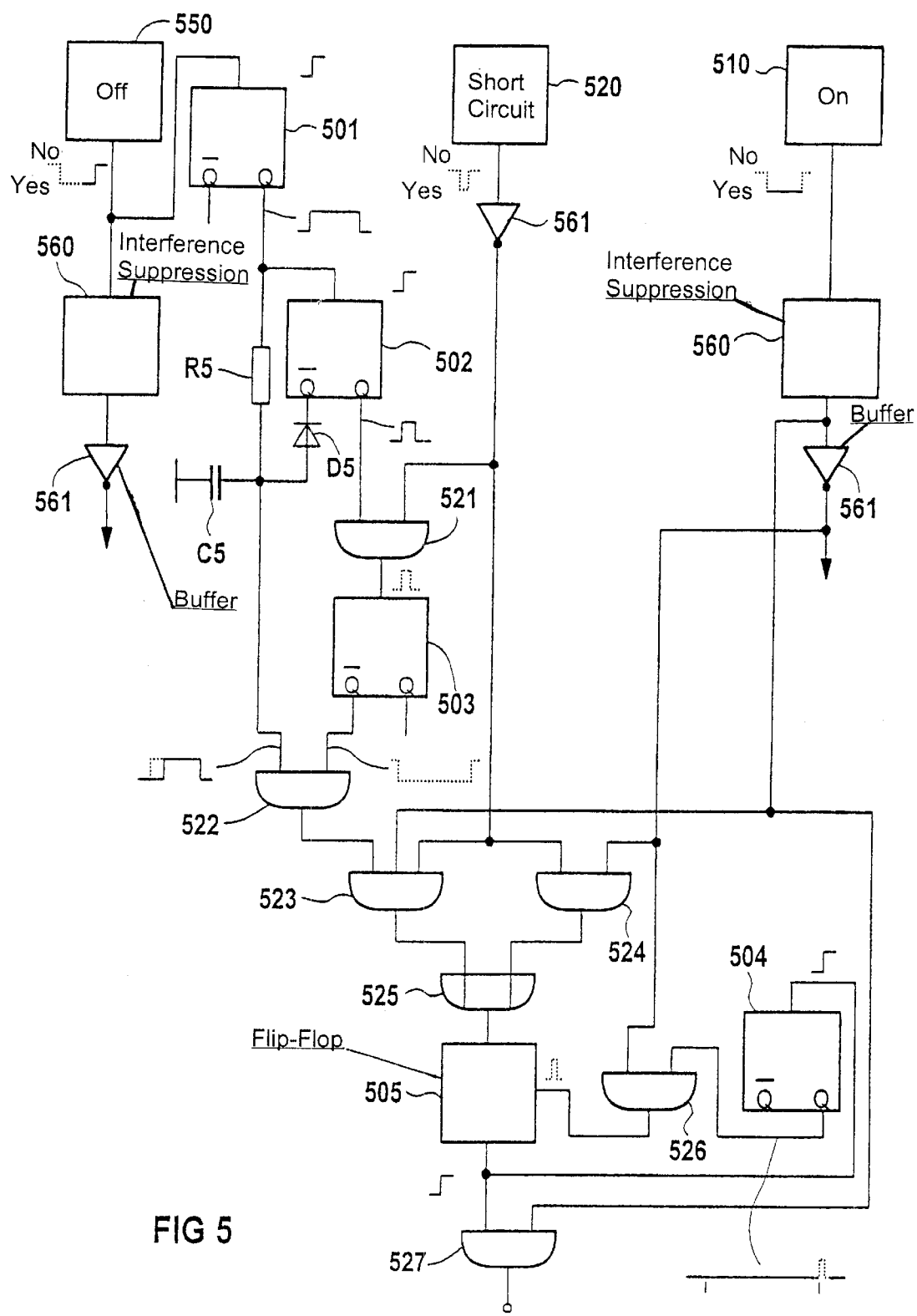
FIG. 5 is a circuit diagram of an interference suppression circuit for storing a short-circuit event in the case of a close/open- or an open/short-circuit disconnection.

In FIG. 5, the individual units are provided with reference numerals in the 500s to improve clarity. Specifically, in this case, 510, 520 and 550 signify sensors for electrically "on", "short circuit" and electrically "off", corresponding to the units 10, 20 and 50 in FIG. 6. Two identical interference suppression circuits 560, each with downstream inverting buffers 561, are configured as shown in FIG. 3 or FIG. 4 and supply output signals for further processing. In FIG. 5, the signals are additionally logically combined with the signal for short circuit.

The three signal paths have four associated multivibrators 501 to 504, which are each appropriately ANDed via AND gates 521, 522 and 526. There are AND gates 521, 523 (AND gate I), 524 (AND gate II), an EXCLUSIVE-OR gate 525 and a flip-flop 505, which is ANDed with the fourth multivibrator 504 via the AND gate 526. The AND gate 527 outputs the output signal which has been subjected to interference suppression.

In the circuit for interference suppression for the short-circuit indicator shown in FIG. 5, the signal from the short-circuit sensor is ANDed by the AND gates 523 and 524, in the block diagram, either with a "C-O" switching operation (I) or with a "O" switching operation (II).

I. "C-O" switching operation:

The signal change for the "off" sensor (yes→no) is limited by a subsequent 100 ms timing stage to once per 100 ms. This prevents the signal path to the flip-flop memory 505 from being disabled in the event of an actual short-circuit switching operation.

A further 20 ms timing stage and an RC element, for example RC=1 ms, are used to achieve uninterrupted signal shifting by 20 ms. During this time, the signal path is disabled by the AND gate 523. The Q output of the timing stage 502 is used to enable a short-circuit signal path via the downstream AND gate 521, and, in the event of a short-circuit signal arising, a third timing stage 503 produces a 200 ms disable pulse, since in this case the short-circuit signal should be regarded as a fault. While the switching device is connected or switched on, the AND gate 523 is permanently disabled through the use of a signal line from the "on" sensor, which has been subjected to interference suppression.

"O"—Switching Operation

When the switching device is connected, the "on" sensor is used to enable the signal paths of the AND gate 524 and of the AND gate 526 for resetting the "short circuit" flip-flop 505, and to disable the AND gate 527 for the short-circuit indicator. If the short-circuit sensor now supplies a short-circuit signal, the flip-flop 505 is set. The flip-flop 505 switches a timing stage 504, which outputs a reset pulse 300 ms later. If, at this instant, the inverted "on" signal which has been subjected to interference suppression is in the "no" state, the reset signal is disabled via the AND gate 526 connected downstream of the timing stage 504, and the flip-flop 505 remains "set". Otherwise, the flip-flop 505 is "reset", and the short-circuit indicator continues to indicate "no". In summary, the properties of the passive and the active interference suppression in signals for detecting switching states are explained using examples and the corresponding evaluation strategy.

If the interference suppression circuits shown in FIGS. 3 to 5 are used with the circuit known per se and shown in FIG. 6, this results in appropriate modifications to the individual monitoring units. Using the example of FIG. 5, interference suppression circuits 560 are for this purpose connected in between the sensors and the individual inverting buffers 561.

In general, each of the aforementioned "on", "off", "welded", "overcurrent" and "short circuit" sensor signals is passed via an associated interference suppression circuit and an inverting buffer. This is shown symbolically in FIG. 6 by the circuit region 500. The aforementioned structuring in levels I to V in FIG. 6 applies similarly to the unit 10 for recording the switch position "on", to the unit 20 for recording "short circuit", to the unit 30 for recording "overcurrent", to the unit 40 for recording the switching shaft position "welded" and to the unit 50 for recording the switch position "off". Specifically, respective pulse shapers 11, 21, 31, 41, 51 are connected downstream of the circuit region 500 used for signal interference suppression. Multivibrators 12, 60, 64, 70 are provided and, as shown in FIG. 6, are connected to flip-flops 22, 32, to AND gates 52, 62, 63, 74 and to NAND gates 83, 61. The buffers 13, 23, 33, 43, 53 are followed by the indicator units 14, 24, 34, 44, 54 with light-emitting diodes.

Finally the properties of the passive and the active interference suppression in signals for recognizing switching states are summarized together with the applied evaluation strategy:

I. Evaluation Problems for the Following Outlined Exemplary Cases

EXAMPLE 1

| | | |
|---|---|---|
| switching device in switched-off state | => | steady-state, interference-suppressed off-signal |
| magnetic field interference | => | unknown, temporal signal falsification |
| switching device remains in the off-state | => | steady-state, interference-suppressed off-signal |

EXAMPLE 2

| | | |
|---|---|---|
| switching device in the switched-off state | => | steady-state, interference-suppressed off-signal |
| short-circuit switch-on C-O by closing the switching contacts | => | temporal signal change |
| switching device again in the switched-off state | => | steady-state, interference-suppressed off-signal |

EXAMPLE 3

| | | |
|---|---|---|
| switching device in the switched-off state | => | steady-state, interference-suppressed off-signal |
| short-circuit switch-on C-O by closing the switching contacts | => | signal interference as a result of short-circuit current magnetic field |

-continued

| switching device again in the switched-off state | => | steady-state, interference-suppressed off-signal |

II. By a Passive Interference Suppression of the Magneto-sensors Against Magnetic Field Interference it is Achieved that the Interference Duration due to the Required Interference Amplitude Can Last Less Than 200 Milliseconds.

III. Evaluation Strategy

1. Assumption of a Single Error Certainty:

A short circuit switch-on (duration<100 ms) and an independent, exterior magnetic field interference (duration<200 ms) cannot occur simultaneously. The probability of double errors is rated as being negligible.

2. Strategy of the Active Interference Suppression

Due to the single error certainty, the dynamic sensor signals can be assumed to be undisturbed when the mechanical short circuit switch-on begins. The voltage signals which are supplied directly by the sensor and in which signals the interference has not yet been suppressed are understood as dynamic sensor signals. The signal change of the "off"-sensor yes→no therefore supplies the beginning of the mechanical actuation.

Assuming that except for the above-mentioned sensors ("on", "off", "welded", "overcurrent", and "short-circuit") no further sensors for a signal detection (e.g. current transformer for short circuit detection) are provided, there is only a single solution for distinguishing between a true and a false short circuit signal.

A true short circuit signal occurs only more than 20 ms after the dynamic signal change of the "off" sensor yes→no.

For a false short circuit signal, due to a simultaneous influence of the interfering magnetic field on the sensors, the dynamic signal change of the "off" sensor and of the "short-circuit" sensor will occur about at the same time ($\Delta t<<10$ ms).

Assuming there is a restriction to the described function of the sensors and assuming no further measures for an interference suppression are used, then the above-described strategy is the only solution for the task of suppressing an interference.

I claim:

1. A method of monitoring a switching device, the method which comprises:

monitoring state parameters in a switching device by recording and evaluating sensor signals of electrical sensors susceptible to an interference caused by at least one of an external electrical field and an external magnetic field;

determining if and when the sensor signals are disturbed signals by evaluating a temporal sequence of the sensor signals;

applying a passive interference suppression using a passive interference suppression device;

applying an active interference suppression by generating evaluation signals corresponding to the undisturbed signals, with the sensors recording steady-state signals and transient signals of switching states of the switching device;

deriving a state signal from each of the steady-state signals by electronically processing the steady-state signals, the state signal following a state change after a given time interval if a new state remains unchanged within the given time interval, and forming an interference-suppressed steady-state signal;

deriving a further state signal from each of the transient state signals of slow actuators, by electronically processing the transient state signals, the further state signal following a further state change after a further given time interval if a further new state remains unchanged within the further given time interval, and forming an interference-suppressed transient state signal;

logically combining transient state signals of fast actuators with the interference-suppressed steady-state signals and the steady-state signals not subjected to interference suppression; and as a result of the combining step, selectively performing at least one of the steps of enabling a signal path of a transient state signal, disabling the signal path of the transient state signal, permanently storing the transient state signal after being temporarily stored, and erasing the transient state signal after being temporarily stored.

2. The method according to claim 1, wherein the step of monitoring the state parameters in the switching device includes monitoring at least one of a switch position, a tripping cause and a device fault.

3. The method according to claim 1, which comprises decoupling the evaluation signals from an interference produced by the switching device.

4. The method according to claim 1, which comprises decoupling the evaluation signals from the interference caused by at least one of the external electrical field and the external magnetic field.

5. The method according to claim 1, which comprises electronically processing the evaluation signals.

6. The method according to claim 1, which comprises:

checking the evaluation signals for plausibility; and discriminating the evaluation signals from signal patterns caused by the interference.

7. The method according to claim 1, which comprises providing a bimetallic strip as one of the slow actuators.

8. The method according to claim 1, which comprises:

assessing given transient state signals selectively as a state signal unaffected by the interference and a state signal affected by the interference by using a defined temporal signal pattern of given sensor signals; and if the state signal affected by the interference has been recognized, performing at least one of the steps of disabling the signal path and erasing the transient state signal after being temporarily stored for deriving interference-suppressed transient state signals from the transient state signals.

9. The method according to claim 8, wherein the step of assessing the given transient state signals includes assessing a short-circuit tripping.

10. The method according to claim 9, which comprises:

storing the interference-suppressed transient state signals; and indicating only a superordinate one of the interference-suppressed transient signals.

11. The method according to claim 10, which comprises storing at least one of an overcurrent tripping signal and a short-circuit tripping signal as the interference-suppressed transient state signals.

12. In combination with a switching device having state parameters, a device for monitoring the state parameters, comprising:

electric sensors for recording sensor signals significant for a switching state, said electric sensors being susceptible to an interference caused by at least one of an external electrical field and an external magnetic field;

an evaluator connected to said electric sensors for evaluating a signal sequence of the sensor signals and for determining if the sensor signals are affected by the interference;

a passive interference suppression device associated with said sensors for a passive interference suppression; and an active interference suppression device connected to said evaluator generating evaluation signals corresponding to the sensor signals in a state unaffected by the interference for an active interference suppression.

13. The device according to claim 12, wherein said sensors record the sensor signals significant for the switching state corresponding to at least one of a switch position, a tripping cause, and a device fault.

14. The device according to claim 14, wherein said passive interference suppression device is a shield for shielding said sensors against at least one of the external electrical field and the external magnetic field.

15. The device according to claim 14, wherein said shield includes shielding plates made of at least one of a ferromagnetic material and a nonferromagnetic material with a high electrical conductivity.

16. The device according to claim 15, wherein said active interference suppression device is an electronic circuit.

17. The device according to claim 16, wherein said electronic circuit recognizes an occurrence of a disturbance of said sensors by recognizing a predefined faulty signal pattern of the sensor signals.

18. The device according to claim 17, wherein said electronic circuit evaluates a signal pattern by evaluating at least one of current ones of the sensor signals and temporal courses of the sensor signals.

19. The device according to claim 12, wherein said passive interference suppression device together with said active interference suppression device terminate interference events with a sufficient strength within a given time interval.

20. The device according to claim 12, wherein said evaluator temporarily stores changes of the state parameters and retains old values of the state parameters, if a fault is recognized within a given time interval.

21. A method of monitoring a switching device, the method which comprises:

monitoring state parameters in a switching device by recording and evaluating sensor signals of sensors susceptible to an interference caused by at least one of an external electrical field and an external magnetic field;

determining if and when the sensor signals are disturbed signals by evaluating a temporal sequence of the sensor signals;

applying a passive interference suppression using a passive interference suppression device; and applying an active interference suppression by generating evaluation signals corresponding to the undisturbed signals.

* * * * *